Patented Aug. 17, 1954

2,686,777

UNITED STATES PATENT OFFICE 2,686,777

ISOLATION OF DEXTRAN BY ALKALINE EARTH HYDROXIDE COMPLEX FORMATION AND PRODUCTS THEREOF

Ernest L. Wimmer, Springfield, Pa., assignor to The American Sugar Refining Company, New York, N. Y., a corporation of New Jersey No Drawing. Application December 18, 1950, Serial No. 201,497

15 Claims. (Cl. 260—209)

This invention relates to the production of gum dextran and more particularly to an improved method of isolation of the dextran; and includes improvements in the process of recovering the dextran and new dextran complex products.

In the microbiological production of gum dextran by fermentation of sucrose solutions by species of the genus Leuconostoc, i. e., strains of L. mesenteroides and L. dextranicum, a sterile sucrose solution containing inorganic salt nutrients and fortified with essential amino acids and vitamins, is inoculated with an actively growing pure culture of the genus Leuconostoc capable of synthesizing dextran, and the sucrose is enzymatically converted to dextran and fructose plus minor byproducts.

Various processes have been proposed for producing dextran, as shown, for example, in U. S. Patents Nos. 2,310,263, 2,392,258 and 2,409,816, and British Patents 618,999 and 634,129.

The generally accepted procedure for the recovery of gum dextran from the fermentation media is to dehydrate and render the colloidal dispersion of dextran unstable by adding a water-miscible volatile organic solvent to the culture liquor. Methyl, ethyl or isopropyl alcohols, acetone and methyl ethyl ketone are generally satisfactory. The solvent concentration is usually 50-70% and the precipitated product is purified by several reprecipitations with solvent from water.

The present invention provides a new practical method of isolation of dextran from the fermentation media which does not require the use of organic solvents and which results in the production of new and useful complex chemical compounds, namely, complex addition products of the alkaline earth metal hydroxides and dextran.

One of the objects of the invention is to provide a practical process for the separation and recovery of microbiologically produced dextran from the fermentation liquors which does not require the use of organic solvents. Another object of the invention is to produce new and useful addition complexes, namely, alkaline earth metal hydroxide-dextran complexes.

The invention includes improvements in the treatment of dextran fermentation liquors whereby alkaline earth hydroxide-dextran complexes can be produced therefrom as products of the process and further treated for the separation of dextran therefrom.

The invention also includes improvements in the production of a mixed product containing calcium hydroxide-dextran complexes and calcium hydroxide-fructose complexes as a coprecipitated product and the further treatment of this product to separate dextran and fructose therefrom, or to produce a solution or syrup therefrom containing a mixture of dextran and fructose.

The invention also includes an improved process for producing the new complex addition compounds by treatment of dextran which has been produced and isolated by other processes, particularly by the solvent precipitation process.

The invention also includes improvements in the purification of dextran isolated from fermentation liquors whereby the isolated dextran is converted to the complex addition product, which is isolated and a purer dextran is then obtained therefrom.

The fermentation process for producing the fermentation liquors containing dextran may be carried out in accordance with known processes and the new recovery process of the present invention can be applied to such dextran containing fermentation liquors. In carrying out the dextran fermentation process a sterile sucrose-bearing solution of density from around 5° to 35° Brix at a pH between 6 and 8 and containing inorganic salt nutrients and fortified with a source of essential amino acids and vitamins is inoculated with an actively growing pure culture of the genus Leuconostoc capable of synthesizing dextran and the sucrose is enzymatically converted to dextran and fructose plus minor byproducts.

According to the present invention, when the maximum dextran production has been obtained, there is added to the fermentation liquor the appropriate amount of alkaline earth hydroxide, i. e., from the group calcium, strontium, and barium hydroxides, to produce complete precipitation of dextran as a complex compound which will be referred to as an alkaline earth hydroxide-dextran complex. Calcium hydroxide is advantageously used, and when used the byproduct fructose is coprecipitated as the fructose complex. The strontium and barium hydroxide complex compounds of fructose are soluble and are not coprecipitated with these alkaline earth hydroxide dextran complexes.

Instead of adding the alkaline earth hydroxides they can also be produced in situ to precipitate the dextran complexes. This may be particularly desirable when the alkaline earth hydroxide is difficultly soluble, i. e., calcium hydroxide and strontium hydroxide, and the rate of precipitation is slow. To produce the alkaline hydroxides in situ there is used a soluble alkaline earth salt such as the chloride or nitrate and a strong alkali such as sodium hydroxide or potassium hydroxide. Thus the dextran and fructose may be recovered from the fermented beer by addition of calcium chloride and sodium hydroxide to produce sufficient calcium hydroxide for the reaction. The precipitation is substantially instantaneous under these conditions.

The precipitated complexes of alkaline earth hydroxide and dextran are white flocculent precipitates which are readily isolated from the fermentation beer by filtration or centrifuging. After washing with water, the complex compounds may be dried and marketed as such or they may be used directly as a source of dextran in certain organic syntheses, especially those syntheses which take advantage of the strong alkalinity of the compounds, such as ether and ester formation.

The precipitated alkaline earth dextran complexes or the coprecipitated dextran and fructose complexes with calcium hydroxide can advantageously be treated for the separation of dextran, or for the separation of dextran and fructose.

Where it is desirable to isolate the pure dextran the alkaline earth complex is suspended in water and treated to remove the metallic constituents. Thus, carbon dioxide can be bubbled into the suspension and the alkaline earth complex decomposed to yield a solution of dextran, or dextran and fructose, and a suspension of alkaline earth carbonate. The latter is recovered by centrifuging and may be reused after decomposition by heat into carbon dioxide and alkaline earth oxide. The solution of dextran may be completely demineralized by ion exchange treatment and dried by spray drying or drum drying.

The alkaline earth hydroxide-dextran complexes may also be treated with other acids which will produce an insoluble alkaline earth salt and liberate dextran, e. g., sulfuric acid, phosphoric acid, sulfurous acid, etc.

A further modification of the process consists in acidifying the addition complex of alkaline earth hydroxide and dextran to dissolve the precipitate, e. g., using hydrochloric, hydrobromic or nitric acid, and subsequently deionizing the dextran solution with ion exchange resins.

Where the dextran has been recovered from the fermentation medium as the calcium hydroxide-dextran complex, fructose will have been coprecipitated as the calcium hydroxide-fructose complex. The resulting mixture may be treated by the above procedure for the removal of calcium as an insoluble precipitate and to give a solution of dextran and fructose which may find direct utility in the food or pharmaceutical industry.

Since the presence of fructose in the fermentation liquors complicates the recovery of dextran by the coprecipitation of the dextran and fructose complexes, the process may be advantageously modified and simplified by removing the byproduct fructose by fermentation prior to the dextran precipitation and recovery. Thus, when production of dextran in the fermentation liquor has nearly attained the maximum level the fermentation medium can be inoculated with a strain of yeast or other fast-growing organism which ferments out the fructose, leaving a fermentation liquor free or substantially free from fructose from which the dextran can be precipitated, e. g., as calcium hydroxide complex free or substantially free from the fructose complex.

An alternative procedure for producing the new dextran complexes can be carried out with dextran which has been precipitated from its solutions by a water miscible organic solvent. When such a crude dextran product is precipitated it is dissolved in water to form a solution and such solution is treated with the alkaline earth hydroxide to precipitate the complex which may thus be obtained as a new calcium hydroxide-dextran complex product; or which can be further treated to set free the dextran and precipitate the calcium as an insoluble salt, as above described.

In carrying out the new process of separating dextran in the form of its alkaline earth addition compounds the dextran fermentation process is first carried out and may advantageously be carried out in accordance with the improved fermentation process described in companion application Serial No. 201,498, in which a dilute sugar-bearing solution is fermented with yeast to produce a fresh yeast beer which is used for the subsequent dextran fermentation; and after sterilization this yeast beer is fortified with sucrose or a sucrose-bearing solution and required inorganic nutrients, sterilized and inoculated with a suitable strain of Leuconostoc organism and the dextran fermentation is carried out.

When maximum production of dextran has been obtained in the fermenter, either by the above process or by other processes of dextran fermentation, the pH is adjusted to 7.0–8.5 with lime or alkali and the fermented product is heated to boiling so as to terminate enzymatic activity and coagulate proteins in the fermented beer. After clarification by centrifuging or filtration the filtrate is cooled to below 30° C. and advantageously to less than 15° C. A slurry or solution of alkaline earth oxide or hydroxide is then added until precipitation of dextran in the form of its addition compound is complete. Or alternatively the alkaline earth hydroxides are formed in situ from a soluble alkaline earth salt such as the chloride or nitrate and a strong alkali such as caustic soda or caustic potash.

The quantity of alkaline earth hydroxide required for forming the addition compounds of dextran and fructose is approximately 1 mol of base for each mol of fructose, and approximately 1 mol or somewhat more than 1 mol of base for each mol of glucose-equivalent ($C_6H_{10}O_5$) in the dextran. Sufficient alkaline earth base should be added to satisfy the metal hydroxide complex capacity of the dextran and fructose.

The composition of the precipitated calcium hydroxide-dextran complex and of the coprecipitated calcium hydroxide complexes of dextran and fructose will vary somewhat, depending upon the conditions of the precipitation. Products containing from about 21% to about 29% of calcium oxide (CaO) have been obtained in the coprecipitated dextran and fructose complexes with calcium hydroxide; and also in the calcium hydroxide-dextran complex. When a dextran solution is treated with alkaline earth hydroxides in excess of the minimum amount required for complete precipitation, precipitates containing somewhat larger amounts of alkaline earth hydroxide content are obtained.

The addition complex of dextran with strontium and barium hydroxides can be precipitated from solutions containing fructose, since the strontium and barium hydroxide complexes of fructose are water soluble and remain in solution.

With calcium hydroxide, however, the dextran complex is coprecipitated with the fructose complex as a coprecipitated product. The use of calcium hydroxide for coprecipitating the dextran and fructose as addition compounds is advantageous because of its economy and because the flocculent precipitates formed are readily handled; and both the dextran and the fructose can be separated together from the same solution in this way.

The precipitated alkaline-earth hydroxide dextran complexes are white flocculent precipitates which are easily isolated from the fermentation beer by filtration or centrifuging. After washing with water they may be dried and marketed as such or may be used directly as a source of dextran in certain organic syntheses, as above pointed out.

Where it is desirable to isolate the pure dextran the addition compounds are suspended in water and treated to remove the metallic constituents, e. g., by bubbling carbon dioxide through the suspension to give a solution of dextran, or of dextran and fructose, and to precipitate the alkaline earth carbonate, as previously described. The dextran solution, when admixed with fructose, can be separated by fermentation of the fructose, as above described; or the combined dextran and fructose solution or syrup may be directly used in the food or pharmaceutical industry.

The invention will be further illustrated by the following examples but it will be understood that the invention is not limited thereto.

Example 1 illustrates a preferred and advantageous method of producing the dextran, this method being that of companion application Serial No. 201,498, in which yeast is first cultivated in a dilute raw sugar solution to form a nutrient medium followed by sterilization and fortification with sucrose and carrying out of the dextran fermentation.

Example 1.—The following ingredients are mixed together and sterilized by heating at 250° F. for 10 minutes:

|  | Parts |
|---|---|
| Raw sugar | 10.0 |
| $KH_2PO_4$ | 5.0 |
| $MgSO_4.7H_2O$ | 0.2 |
| NaCl | 1.0 |
| $(NH_4)_2SO_4$ | 0.6 |
| Water to | 1000 | pH adjusted to 4.8 with $H_2SO_4$.

After cooling to 28° C. an active culture of S. cerevisiae growing in a similar medium is added. The inoculum is 3% of the volume of the fermenter medium. Air is blown through at a rate equivalent to 0.5 vol. air per vol. fermenter per minute. After 10 hours the medium is free of sugar and contains $6 \times 10^5$ yeast cells/ml. It is pasteurized by heating to 80° C. for 30 minutes and then filtered. Granulated, refined sucrose (100 parts) is added to the filtrate and the pH is adjusted to 7.0 with NaOH.

The resultant fermentation medium is sterilized at 125° C. for 10 minutes. After cooling to 25° C., it is inoculated with an active 12 hour culture of L. mesenteroides which is growing in an identical medium. The inoculation is 5% by volume. The fermentation medium becomes opalescent after several hours and a rapid increase in viscosity is observed which reaches a maximum in about 32 hours. Analyses of the smooth, viscid fermented medium so produced have indicated the presence of 42.7 parts of dextran, 48.4 parts reducing sugar calculated as fructose and only 9.5 parts of residual sucrose.

The following examples illustrate the new separation process as applied to the dextran fermentation product of Example 1, but it will be understood that they are also applicable to dextran fermentation products produced by other processes.

Example 2.—The fermented medium in Example 1 is treated as follows to recover the fermentation products, dextran and fructose. The fermented medium, the pH of which is adjusted to 7.5 with lime, is diluted with an equal volume of water to reduce the viscosity and after sterilization at 125° for 10 minutes it is clarified by centrifuging in a high speed supercentrifuge.

After dilution, sterilization and clarification the medium is cooled to 5° C. For each 1000 parts of diluted, clarified medium, there is added 100 parts of 3M $CaCl_2$ solution. Then with vigorous stirring 200 parts of 3M NaOH solution is added. There is an instantaneous quantitative precipitation of the calcium hydroxide-dextran and calcium hydroxide-fructose complexes which are centrifuged and washed with saturated lime water.

This coprecipitated product can be treated with sufficient carbon dioxide to set free both the dextran and the fructose to give a dextran and fructose solution.

Example 3.—This example illustrates the further fermentation of the dextran fermentation product of Example 1 with yeast to remove the fructose before the dextran is precipitated with calcium hydroxide.

The fermentation medium in Example 1, 28 hours after inoculation with L. mesenteroides, is inoculated with an active yeast culture, S. cerevisiae (5% of the fermenter volume). Within four hours the dextran production reaches a maximum and there is a rapid fermentation of the by-product fructose which is evidenced by the evolution of gas ($CO_2$). Twenty-four hours after inoculation with yeast, the medium, now free of fructose, is diluted with an equal volume of water and the pH is adjusted to 8.0 with lime. It is then sterilized at 125° C. for 10 minutes.

Example 4.—This example illustrates the production of the barium hydroxide-dextran complex by treating the fructose-free Leuconostoc beer as prepared in Example 3 with barium hydroxide, and the treatment of the precipitated addition complex with sulfuric acid to liberate the dextran and remove the barium as barium sulfate.

The fermenting Leuconostoc mesenteroides medium as prepared in Example 1 is treated as in Example 4 to produce a beer free of fructose. To 1000 parts of diluted, sterilized and clarified fructose-free beer, there is added 450 parts of a 10% solution of $Ba(OH)_2$. There is an instantaneous precipitation of white flocculent barium hydroxide-dextran complex which is washed with a 1% solution of $Ba(OH)_2$.

The washed precipitate is suspended in water and sufficient sulfuric acid (10%) is added to set free the dextran and precipitate the barium as $BaSO_4$. After centrifugation, the dextran solution which is obtained as the centrifugate is concentrated and dried.

Example 5.—This example illustrates a modification of the process in which the fructose and dextran are coprecipitated from the Leuconostoc beer, the precipitated product carbonated to liberate dextran and fructose, and the dextran precipitated from the solution with an organic solvent, with subsequent recovery of the fructose from the remaining solution.

A precipitate of a mixture of the addition compounds of calcium hydroxide with dextran and fructose is obtained from the *Leuconostoc mesenteroides* fermentation as described in Example 2.

The washed precipitate is suspended in water and carbonated to completely liberate dextran and fructose. The precipitate of calcium carbonate is filtered off and a solution of dextran and fructose is obtained.

The solution is treated with an equal volume of ethanol to precipitate pure dextran as a gummy mass which is dehydrated to friable pellets. The decantate is distilled to recover the ethanol and fructose is easily crystallized by evaporation of the still residue.

The improved recovery process of the present invention has several advantages, among which are the following: (1) the direct treatment of the dextran fermentation product to precipitate the dextran as the alkaline earth hydroxide-dextran complex avoids the handling of large volumes of inflammable solvents such as have been used in prior processes; (2) both the fructose and the dextran may be recovered in one operation from the fermentation product in substantially quantitative yields, when coprecipitated as the calcium hydroxide compounds; (3) the dextran is separated as an easily handled flocculent precipitate rather than as an amorphous sticky mass; (4) because of its physical character the precipitated product is more easily purified than the amorphous dextran obtained by solvent precipitation; (5) because the alkaline earth hydroxide-dextran compounds are insoluble the fermented medium may be diluted considerably before precipitation, thus resulting in a purer product because of less occlusion of impurities; and (6) new highly reactive alkaline earth compounds of dextran, namely, the alkaline earth hydroxide-dextran complexes, become available at low cost. The alkaline earth hydroxide-dextran compounds are not only new and useful products themselves but can be readily treated to separate dextran therefrom; while the coprecipitated calcium hydroxide compounds of dextran and fructose can be readily treated to produce a solution of dextran and fructose, or to separate the dextran and fructose from each other. Even where the dextran is precipitated from the fermentation product by organic solvents the subsequent purification of this dextran by precipitation with an alkaline earth hydroxide gives the new alkaline earth hydroxide-dextran products from which purified dextran can be readily recovered.

I claim:

1. The method of producing complex addition products of calcium hydroxide and dextran which comprises reacting an aqueous solution of dextran containing dextran as a principal constituent with soluble constituents which form calcium hydroxide and in sufficient amount to form at least approximately 1 mol of calcium hydroxide for each glucose equivalent in the dextran, thereby precipitating the dextran from the solution as a calcium hydroxide-dextran complex.

2. The method of recovering dextran from a fermented culture medium containing dextran in solution as a primary fermentation product which comprises forming a sufficient amount of calcium hydroxide in the solution to precipitate the dextran as a calcium hydroxide-dextran complex containing at least about 1 mol of calcium hydroxide for each glucose equivalent in the dextran, and separating the precipitated product from the remaining solution.

3. The process according to claim 2 in which the precipitated complex is further washed with a dilute solution of calcium hydroxide.

4. The method of recovering dextran and fructose from a fermented culture medium containing them which comprises adding a sufficient amount of calcium hydroxide to precipitate the dextran and fructose as insoluble addition compounds and separating the coprecipitated compounds from the remaining solution.

5. The process according to claim 4 in which the coprecipitated compounds are washed with a dilute solution of calcium hydroxide.

6. The process according to claim 2 in which the calcium hydroxide is formed by the addition to the fermented culture medium of substantially stoichiometric proportions of a soluble calcium salt and caustic alkali.

7. The process according to claim 4 in which the calcium hydroxide is formed by addition to the fermented culture medium of substantially stoichiometric proportions of a soluble calcium salt and caustic alkali.

8. The method of recovering dextran from a fermented culture medium containing dextran and fructose which comprises inoculating the medium with an active yeast culture and removing the fructose by yeast fermentation, and precipitating the dextran from the fructose-free medium by the addition of alkaline earth hydroxides in sufficient amount to precipitate the dextran as an alkaline earth hydroxide addition compound.

9. The method of producing dextran which comprises treating an alkaline earth hydroxide-dextran compound with an acid which forms an insoluble alkaline earth salt in the presence of water to form a dextran solution and separating the precipitated salt from the solution.

10. The method of producing dextran which comprises treating an alkaline earth hydroxide-dextran compound with an acid in the presence of water to form a dextran solution containing ionic impurities, and separating such impurities from the solution by treatment with ion exchange resins.

11. The method of producing dextran and fructose which comprises treating a mixture of calcium hydroxide addition compounds of dextran and fructose with an acid in the presence of water to form a solution of dextran and fructose containing ionic impurities, and separating such impurities from the solution by treatment with ion exchange resins.

12. The method of purifying dextran which comprises precipitating dextran from an aqueous solution by reaction with an alkaline earth metal hydroxide to form an addition compound, separating such compound from the remaining solution, treating such compound with an acid which forms an insoluble alkaline earth metal salt in the presence of water to form a dextran solution, and separating the insoluble salt from the solution.

13. The method of producing dextran and fructose from coprecipitated dextran and fructose addition compounds of calcium hydroxide which comprises treating the same with an acid which forms an insoluble calcium salt in the presence of water to form a solution of dextran and fructose and separating the solution from the precipitated salt.

14. A new article of manufacture a calcium hydroxide-dextran addition compound, said compound containing from about 21% to about 29% of calcium oxide.

15. As a new article of manufacture a calcium hydroxide-dextran addition compound containing at least about 1 mol of calcium hydroxide for each glucose equivalent in the dextran.

References Cited in the file of this patent

UNITED STATES PATENTS

| Number | Name | Date |
|---|---|---|
| 2,203,702 | Stahley et al. | June 11, 1940 |
| 2,344,190 | Waldie et al. | Mar. 14, 1944 |
| 2,386,994 | Waldie et al. | Oct. 16, 1945 |

OTHER REFERENCES

Gortner, Outlines of Biochemistry, 1949, page 671.